3,198,928
METHOD FOR UPSETTING ELONGATED ARTICLES
William D. Allison, Grosse Pointe Farms, Mich., assignor to Ford Motor Company, Dearborn, Mich., a corporation of Delaware
Filed Aug. 28, 1961, Ser. No. 134,236
4 Claims. (Cl. 219—7.5)

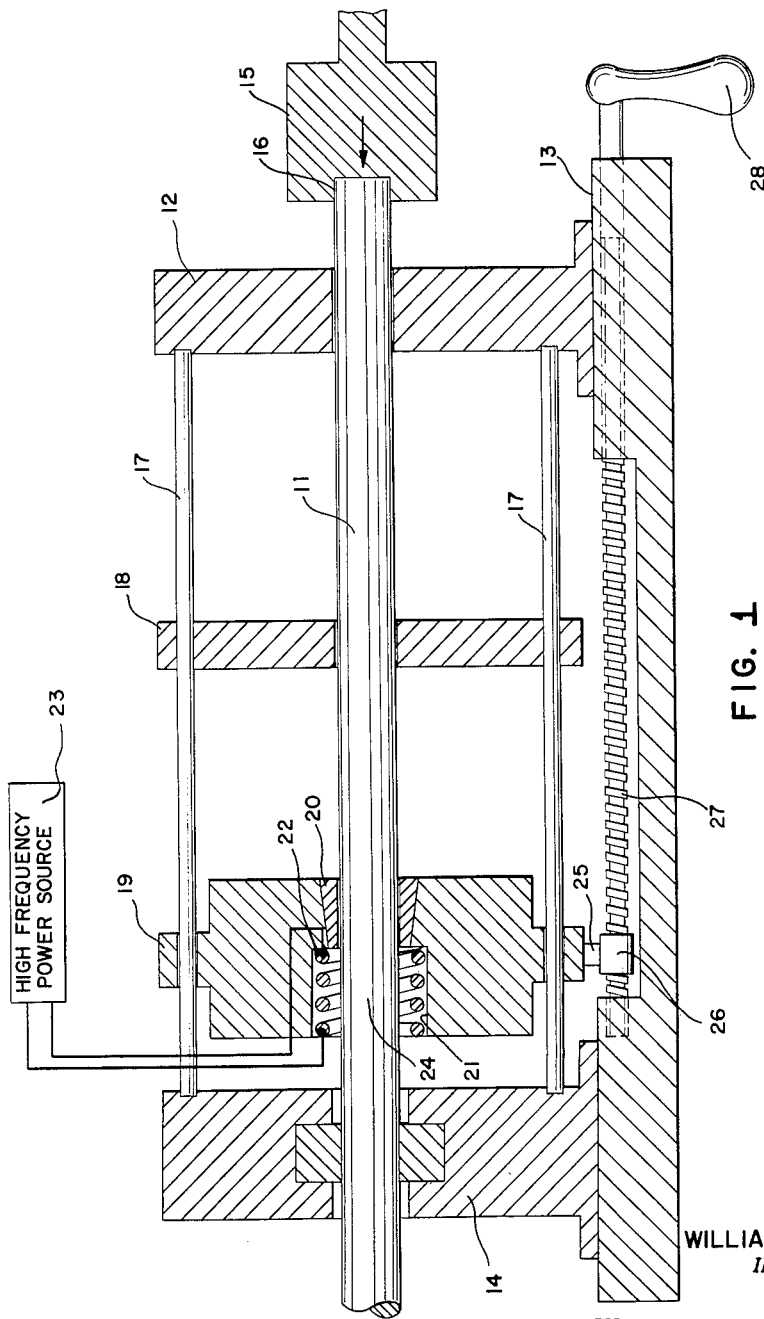

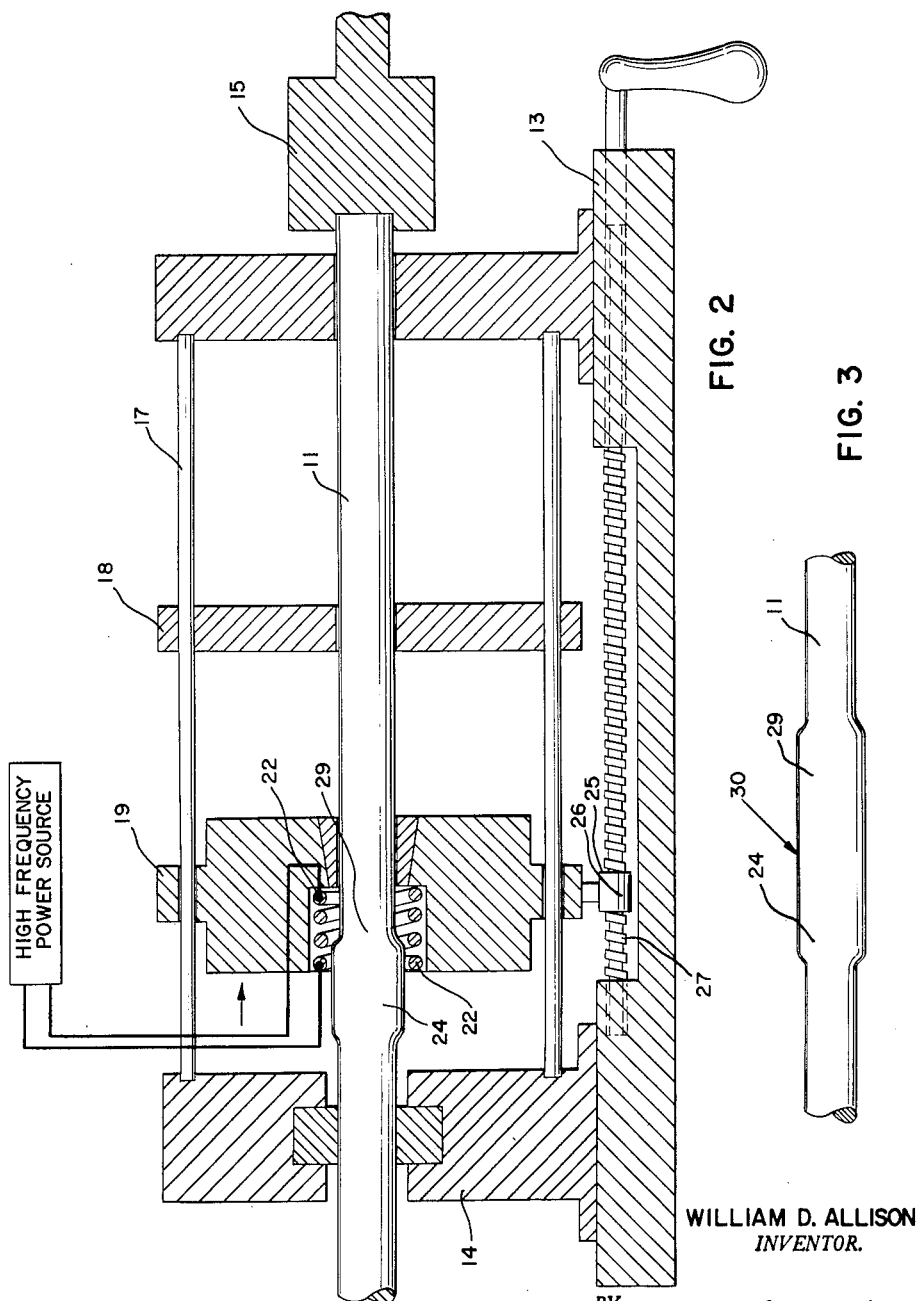

This invention relates to a method for modifying the cross sectional area of an elongated article and more particularly to a method of upsetting articles such as steel bars without the use of an enclosing die.

Currently, the process of upsetting a steel bar, for instance, comprises the steps of heating a portion of the bar to a forging temperature of 1,800° F. to 2,000° F., feeding the heated portion into a die cavity, and then applying an axial thrust to the bar so that the heated portion is enlarged until it fills out the die cavity. Very frequently, progressive dies are required to form a bar to its final specified dimension.

The foregoing conventional practice has the disadvantages of moving each portion of the bar to be upset into a stationary heating chamber. Also, a large investment for dies is required. The use of dies in upsetting articles brings with it such inherent defects as die marks or scale indentations on the surface of the article.

The method of this invention achieves the upsetting of a segment of an elongated article without the use of an enclosing die by locally heating a first portion of the article to render that portion substantially weaker structually than the remainder of the article. Then the article is partially supported against radial displacement by a guide means before an axial thrust is applied to the article to upset the first portion. Then a second portion of the article is heated so that it is substantially weaker structually than the remainder of the article. The guide means is progressively moved with respect to the article at a predetermined rate while the axial thrust is maintained on the article to upset the second portion so that the second portion forms a continuous mass with the first portion.

The rate of relative movement of the guide means and the article is accurately controlled to assure a continuous upset segment of a uniform diameter over an established length.

An object of this invention is to provide a method for upsetting an elongated article without utilizing an enclosing die to form an upset segment to a finished dimension.

A further object is to improve the method of upsetting elongated articles by the elimination of surface defects.

A further object of this invention is to provide a method for locally upsetting elongated articles quickly at a relatively low cost due to the elimination of expensive tooling.

Further objects and advantages of this invention will become more apparent as this description proceeds, particularly when considered in connection with the accompanying drawings in which:

FIGURE 1 is a schematic view in section of an apparatus depicting the first phase of the method of this invention;

FIGURE 2 is a schematic view in section of the same apparatus as seen in FIGURE 1 depicting the second phase of the method of this invention; and, FIGURE 3 is a fragmentary view of a segment of the elongated article upset by the method of this invention.

In FIGURE 1 can be seen a bar 11 which is to be upset by the method of this invention. The cross section of this bar 11 is usually circular, but it can be of any desired configuration. The bar 11 is supported against radial displacement by an end support 12 secured to a base 13. A clamping means 14, also attached to the base 13, grips the bar 11, thereby preventing its axial movement when an axial thrust is applied to the bar 11 by a plunger 15. The plunger 15 has a counter-bored portion 16 to provide a firm retainer for the end portion of the bar 11. The mechanism for the plunger 15 (not shown) is conventional and may be hydraulically, pneumatically, electrically or manually operated.

Two guide rods 17 are disposed parallel to the bar 11 between the clamping means 14 and the end support 12. A spacer plate 18 attached to the guide rods 17 assures the uniform spacing of the guide rods 17 between their end supports.

A guide means 19 is mounted coaxially with the bar 11 and carried by the guide rods 17. The guide means 19 has a bushing 20 through which the bar 11 may be passed with sufficient clearance to permit the axial movement of the guide means 19 relative to the bar 11. A cavity 21 in the guide means 19 houses an inductor 22 which encircles the bar 11. This inductor 22, which may be water cooled if desired, is connected to a high frequency power source 23 of sufficient capacity to heat a first portion 24 of the bar 11 encircled by the inductor 22 to a temperature ranging between 1,800° F. and 2,000° F. in a minimum time interval.

The guide means 19 has an integral link 25 which supports a threaded bushing 26. An externally threaded rod 27, which is supported by the base 13, is operatively connected to the bushing 26. Rotation of the threaded rod 27 moves the guide means 19 along the guide rods 17 between the clamping means 14 and the end support 12. The threaded rod 27 can be rotated in either a clockwise or counterclockwise direction by a handle 28 or any other suitable means to impart movement to the guide means 19. The bushing 20 carried by the guide means 19 circumscribes the periphery of a segment of the bar 11 adjacent the portion being upset. This bushing 20 may provide partial support for the bar 11 at its most critical region as heat is conducted from the portion being upset to its adjacent segment which, thereby, may also be weakened structurally.

In FIGURE 2 is seen a cross sectional view of the same apparatus seen in FIGURE 1 except that the first portion 24 of the bar 11 has already been upset and the inductor 22 now encircles a second portion 29 of the same bar 11. The guide means 19 with its inductor 22 has moved relative to the bar in the direction of the arrow.

The plunger 15, which maintains an axial thrust on the bar 11, has displaced the end of the bar 11 axially in the direction opposite to the movement of the guide means 19. This is due to the upsetting of the first portion 24 of the bar 11 which has reduced the length of the bar 11 accordingly.

As seen in FIGURE 3, the upset first portion 24 and the upset second portion 29 form a continuous upset segment 30 between the ends of the bar 11.

A torsion bar spring for a mounted vehicle front suspension system, for instance, calls for a .845 inch diameter spring steel bar (SAE 5015) to have an upset segment 30 of 1.060 inches diameter at its center over a length of 4 inches. The enlarged diameter has to be achieved within the .031 inch tolerance.

In employing the method of this invention to form the upset, the .845 inch diameter bar 11 is placed through the center openings provided in the clamping means 14, guide means 19, spacer plate 18, and end support 12. Then the bar 11 is firmly gripped by the jaws of the clamping means 14.

The inductor 22 housed in the cavity 21 was machined from a 1 inch thick, 4 inch wide copper plate with an internal diameter of 1.25 inches. The inductor 22, in this instance, was connected through a multiple ratio transformer to a 125 kw., 9,600 cycle motor generator. A 440 volt, 300 k.v.a. capacitor was used in combination with the transformer.

The .845 inch diameter bar 11 was inductively heated to 1,800° F. in 6 seconds by applying a capaitance of 219 k.v.a. to the inductor 22 through a 17:1 transformer ratio. An axial thrust of 4,000 pounds per square inch was applied to the end of the bar 11 by the plunger 15. Rotation of the threaded rod 27 moved the guide means 19 relative to the bar 11 at a rate of approximately 1.00 inch per minute.

Within 4 minutes, the segment 30 of the .845 inch diameter bar 11 was upset to the 1.060 inches diameter dimension with the segment being approximately 4 inches long. The upset segment 30 was obtained with a relatively uniform diameter with a smooth tapering transition taking place on each end of the upset segment 30 best seen in FIGURE 3. Metallurgical tests showed a uniform grain structure was achieved by the method of this invention.

By varying the temperature and the axial thrust, segment 30 of the steel bars 11 may be upset to any reasonable dimension over a predetermined distance by the method of this invention. The rate of relative movement between the guide means 19 and the steel bar 11 is limited though by the speed of conduction of the heat to the inner portion of the bar 11 and the rate of cooling of the upset portion 24.

It is to be understood that the movement of the guide means 19 relative to the bar 11 can also be obtained if the guide means 19 remains fixed and the bar 11 is moved with respect to the guide means. The rate of relative movement may be controlled by manual or automatic means if so desired to permit the application of the method of this invention to the forming of upset segments on a repetitious basis.

I claim:

1. A method of upsetting an elongated metallic article in a plane perpendicular to its axis comprising the steps of heating a first portion of said article to sufficiently soften said first portion, securing the article on one side of said first portion against axial movement, partially supporting said article against radial displacement only by guide means adjacent said first portion, applying an axial thrust to said article from the other side of said first portion sufficiently to upset said first portion, heating a second portion of said article sufficiently to soften said second portion, progressively moving said guide means away from said upset first portion with respect to said article through successive portions at a predetermined rate while maintaining the axial thrust on said article to upset said second portion so that said second portion forms a continuous mass with said first portion.

2. A method of upsetting a steel bar in a plane perpendicular to its axis comprising the steps of heating a first portion of said bar to a temperature ranging between 1800° F. and 2000° F., securing the bar on one side of said first portion against axial movement, partially supporting said bar against radial displacement only by guide means adjacent to said first portion, applying an axial thrust to said bar from the other side of said first portion sufficiently to upset said first portion, heating a second portion of said steel bar to a temperature ranging between 1800° F. and 2000° F., progressively and continuously moving said guide means away from said upset first portion with respect to said bar to successive portions at a predetermined rate while maintaining the axial thrust on said steel bar to upset said second portion so that said portion forms a continuous upset mass with said first portion.

3. A method of upsetting a steel bar in a plane perpendicular to its axis comprising the steps of heating a first portion of said steel bar to a temperature ranging between 1800° F. and 2000° F. with an induction heating means, securing the steel bar on one side of said first portion against axial movement, partially supporting said bar against radial displacement only by guide means adjacent said first portion, applying an axial thrust to said article from the other side of said first portion sufficiently to upset said first portion, heating a second portion of said steel bar to a temperature ranging between 1800° F. and 2000° F. with said induction heating means, progressively and continuously moving said guide means away from said upset first portion with respect to said article through successive portions at a predetermined rate while maintaining the axial thrust on said steel bar to upset said second portion so that said second portion forms a continuous upset mass with said first portion.

4. A method of upsetting a steel bar in plane perpendicular to its axis comprising the steps of heating a first portion of said steel bar to a temperature ranging between 1800° F. and 2000° F. with an induction heating means, securing the steel bar on one side of said first portion against axial movement, partially supporting said bar against radial displacement only by guide means adjacent to said first portion, applying an axial thrust to said steel bar from the other side of said first portion sufficiently to upset said first portion, heating a second portion of said steel bar to a temperature ranging between 1800° F. and 2000° F. with said induction heating means, said induction heating means attached to said guide means, progressively and continuously moving said guide means and said induction heating means away from said upset first portion with respect to said steel bar through successive portions at a predetermined rate while maintaining the axial thrust on said steel bar to upset said second portion so that said second portion forms a continuous upset mass with said first portion.

References Cited by the Examiner

UNITED STATES PATENTS

| 1,945,092 | 1/34 | Storer. |
| 2,473,245 | 6/49 | Hanna. |
| 2,495,060 | 1/50 | Hanna _____ 29—552.4 X |
| 2,780,000 | 2/57 | Huet _____ 29—552.2 X |

FOREIGN PATENTS 756,141   8/56   Great Britain.

WHITMORE A. WILTZ, *Primary Examiner.*

HYLAND BIZOT, *Examiner.*